Inventors:
HORST ROTHERT & ROLF SCHUMACHER
by SAUL JECIES
Their Attorney

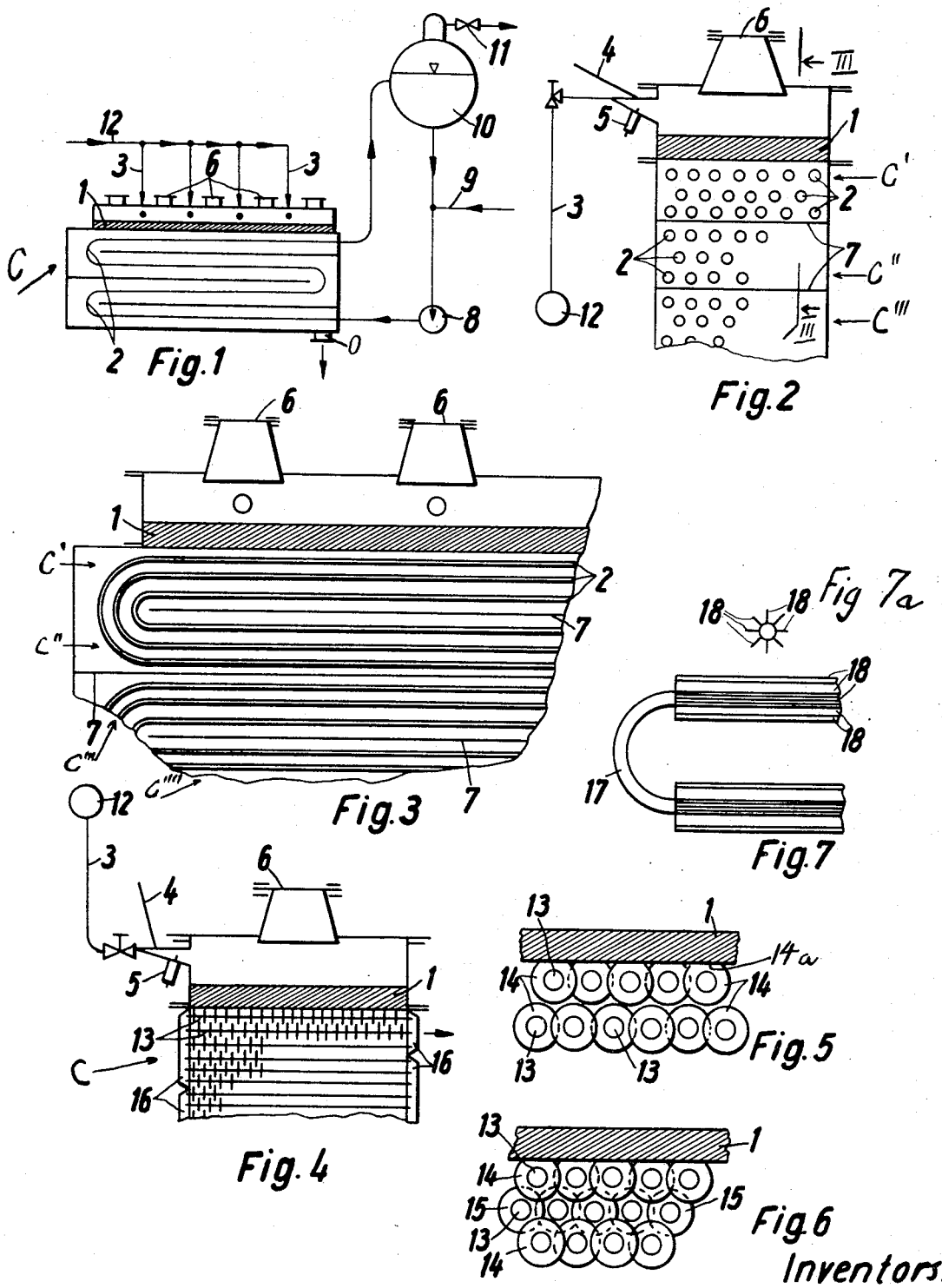

United States Patent Office 3,711,253
Patented Jan. 16, 1973

3,711,253
APPARATUS FOR SYNTHESIS OF FORMALDEHYDE
Horst Rothert and Rolf Schumacher, Berlin, Germany, assignors to Karl Fischer Apparate-u. Rohrleitungsbau, Berlin, Germany, and Societe Chimique des Charbonnages SCC, Courbevoie, France
Filed Jan. 18, 1971, Ser. No. 107,130
Claims priority, application Germany, Jan. 16, 1970,
P 20 02 789.8
Int. Cl. B01j 9/04
U.S. Cl. 23—288 K    13 Claims

ABSTRACT OF THE DISCLOSURE

A mixture of methanol and air is fed from one side into a bed of catalyzer, such as silver, which on reaction with it results in the derivation of formaldehyde-containing gas at the opposite side of the bed. Cooling means is provided directly adjacent this opposite side so that the gas passes into immediate heat-exchanging contact with the cooling means and is cooled thereby.

BACKGROUND OF THE INVENTION

The present invention relates generally to the production of formaldehyde. More specifically, it relates to an arrangement for synthesizing formaldehyde from methanol.

When methanol is subjected to combined oxydation and dehydration in accordance with the formula:

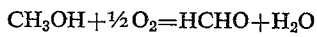
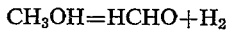

in the presence of a suitable catalyst, formaldehyde is obtained. As a catalyst, silver, or silver and copper in form of thin-wire mesh or in granulate form, is conventionally used for this purpose. Such a process is for instance described in German Auslegeschrift 1,294,360 where a two-layer catalyst is used, composed of a lower coarsely-grained and an upper finely-grained layer. According to that disclosure, such a catalyst is capable of converting 1.5 to 3 tons of methanol per hour and per square meter of catalyst-bed cross-section.

However, in order to avoid undesired secondary reactions, and also to obtain a maximum yield of formaldehyde, it is essential that the formaldehyde-containing reaction gases be cooled as rapidly as possible after leaving the catalyst bed. It is here that the prior art is lacking, in that the rapidity of cooling thus far obtained is less than satisfactory with, obviously, an attendant unsatisfactory yield rate.

SUMMARY OF THE INVENTION

It is, accordingly, an object of the present invention to overcome the aforementioned disadvantages of the prior art.

More particularly, it is an object of the invention to provide an improved arrangement for formaldehyde synthesis which is not possessed of the aforementioned disadvantages.

A concomitant object of the invention is to provide such an arrangement wherein the inventive improvement is of relatively simple construction, and hence is easy to operate and possessed of considerable reliability in its operation.

In pursuance of these objects, and of still others which will become apparent hereafter, the novel arrangement comprises—according to one aspect of the invention—a bed of catalyzer having a first and an opposite second side. Means is provided for feeding a mixture of methanol and air reactive with the catalyzer into the bed at the first side thereof, with resultant derivation of formaldehyde-containing gas at the second side of the bed. Cooling means is provided directly adjacent this second side of the bed and receives the gas so as to cool it with desired rapidity.

The cooling means is, according to the invention, constructed as an elongated gas cooler using one or more cooling coils having a plurality of convolutions; at the same time, the gas cooler also serves to support the catalyzer bed beneath which it is arranged.

In this manner it is possible to obtain a reduction in the original gas temperature of about 600° C. in the most rapid manner and to below 300° C., preferably to about 140° C. This prevents the occurrence of deleterious secondary reactions to a maximum extent. It is possible particularly because the cooling influence exerted upon the gas takes over immediately after the gas leaves the catalyzer, a circumstance which is facilitated if, as is currently preferred and already mentioned above, the gas cooler itself also constitutes the support for the catalyzer bed so that intermediate elements connecting the bed with the cooler—and which would necessarily increase the path traversed by the gas before reaching the cooler—can be omitted.

It is of importance in accordance with the invention that a catalyzer bed can be provided in the inventive arrangement, which can be filled in simple manner with the catalyzer or catalyst to the thickness of a desired even layer, and which can also be constructed to have a larger or smaller surface area in dependence upon the requirements of a given application.

It is advantageous to so construct the bed that it is of rectangular outline and arranged in the region of the upper section of the cooling coil or coils of the gas cooler, that is the first convolutions at the inlet end of the cooler. This assures optimum utilization of the cooling capacity of the gas cooler, while the rectangular outline of the bed makes it possible in simple manner to continuously vary its surface area. Also with such a construction the catalyzer material can be simply and rapidly introduced into and removed from the bed with simple tools.

According to a currently preferred embodiment of the invention the catalyzer bed itself will be located outside the inlet end of the gas cooler housing, with the latter being so arranged that the initial convolutions are located directly subjacent with reference to the catalyzer bed. The housing has a certain length and width and the bed may be at least substantially equal with at least the length of the housing; if so, the bed may have a surface area whose length is smaller than its width, whose edge length is identical (i.e. a square), or which is wider than it is long. The maximum dimensions of the bed are, substantially, determined by the maximum dimensions (length and width) of the gas cooler housing.

The gas cooler is subdivided into several compartments and it is especially advantageous if the gas to be cooled on the one hand, and the cooling medium in its coil (or coils) on the other hand, are passed in counterflow through these compartments. The cooling medium is usually (but need not be) water. The counterflow arrangement is the most efficient in terms of heat exchange and also is best from a point of view of the circulation dictated by the heating of the cooling medium as a result of heat-exchange with the gas. The total quantity of gas formed in the catalyzer enters directly into the cooling range of the coil or coils and at the upper end of the upright gas cooler housing the flow speed of the gas will have reached its maximum value. In the compartments of the housing, which are preferably of rectangular cross-section and largely filled with elongated sections of cooling-coil convolutions, this results in a flow speed of the gas which is so high as to assure a particularly good heat exchange from the gas to the cooling medium.

The novel features of the invention are set forth in the appended claims. Exemplary embodiments of the novel arrangements have, however, been described in the following detailed description of the invention and illustrated in the accompanying drawing.

BRIEF DESCRIPTION OF THE DRAWING

FIG. 1 is a diagrammatic view illustrating in principle the construction of an arrangement according to the present invention;

FIG. 2 is a fragmentary diagrammatic vertical section illustrating one embodiment of the invention;

FIG. 3 is a section taken on line III—III of FIG. 2;

FIG. 4 is a view similar to FIG. 2 but of another embodiment;

FIG. 5 is a fragmentary diagrammatic detail view, on an enlarged scale, of another embodiment of the invention;

FIG. 6 is a view similar to FIG. 5 but showing still a further embodiment of the invention;

FIG. 7 is a detail view, in a fragmentary enlarged showing, of yet another embodiment;

FIG. 7a is a diagrammatic cross-section of FIG. 7;

DESCRIPTION OF THE PREFERRED EMBODIMENTS

Figure 8:
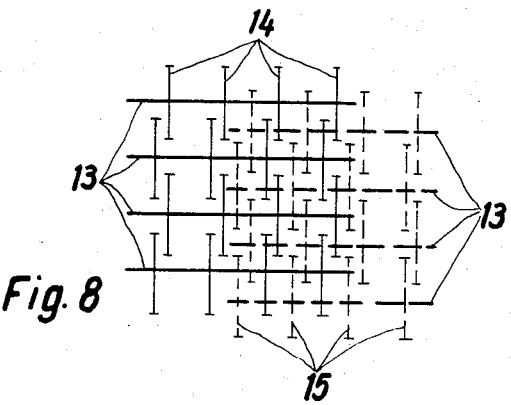
FIG. 8 is a schematic top plan view of the embodiment in FIG. 6.

Discussing now the drawing in detail, and firstly FIG. 1 thereof, it will be understood that the catalyzer bed 1 can be of various desired outlines, such as rectangular, generally polygonal with rounded corners, or—if rectangular—be provided with rounded or semi-circular edges in the regions of its narrow sides. Arranged below it is a gas cooler C which preferably has (as illustrated) several internal compartments C', C" and C'''.

In the embodiments of FIGS. 1-3 the formaldehyde-containing gas which develops in the catalyzer bed advances directly into the upper compartment C'. In this compartment as well as the compartments C" and C'''—all of which are offset with reference to each other—there are arranged elongated sections of convolutions 2 of one or more cooling coils whose construction is well known per se. The compartments C', C" and C''' are of rectangular cross-sectional outline and the cooling medium flowing through the convolutions 2 flows in counterflow direction to the advancing gas entering from the catalyzer bed 1. The rapidly cooled gas leaves the lower end of the lower compartment through the outlet O as indicated by the arrow in FIG. 1. At this time it is further cooled up to the desired extent, i.e. definitely below 300° C. and preferably to 140° C.

The mixture of air and methanol required for the synthesis is supplied via the feed conduit 12 which distributes it to one or more conduits 3 which are arranged above the upper or first side of the catalyzer bed 1, preferably evenly distributed over the surface area of the same. Each of the conduits 3 has associated with it a glow plug or a spark plug 5 and an auxiliary air conduit 4, so as to allow for ignition of the air-methanol mixture. The elements 4 and 5 remain in operation until at the catalyzer the reaction temperature has been achieved; once this is achieved, the largely exothermal reaction is self-sustaining. Viewing ports 6 permit observation of the catalyzer surface.

The interior of the gas-cooler housing is divided into the compartments C', C", etc. by the walls 7 being offset with reference to each other; each of the compartments is so filled with elongated sections of convolutions 2 that the gas leaving the bed 1 will flow over and around the convolutions at highest possible speed, in order to obtain a good heat-exchange factor. The distance between the underside or second side of the bed 1 and the upper (i.e. adjacent) convolutions 2 in the compartment C' is as small as possible, in order to obtain quickest possible cooling action upon the gas and to avoid undesired secondary reactions.

A reservoir 10 contains a supply of cooling fluid and is connected with the convolutions via the illustrated conduit; a pump 8 is interposed which circulates the cooling medium forcibly between the convolutions 2 and reservoir 10. As FIG. 1 shows, the reservoir is located at a level higher than the convolutions 2, in order to avoid the formation of steam in the latter. Such steam as does develop, but in the reservoir 10, is released via the valve 11. Reference numeral 9 identifies a supply conduit which supplies additional cooling medium to reservoir 10.

Instead of plain tube convolutions as shown in FIGS. 1–3, finned convolutions can be used. This is shown in the embodiment of FIG. 4 where like reference numerals identify like components as in the preceding figures. Here, however, the interior of the gas cooler C is not divided into separate compartments. Instead, it is substantially filled with convolutions 13 of a finned tube or tubes. In this embodiment, as in all others, opposite curved portions of the convolutions may also be located outside the housing proper in separate chambers; they may also be in form of pipe sections welded into the housing and having opposite open ends which communicate with collecting chambers 16 as illustrated.

FIG. 5 shows that only the fins 14 of laterally adjacent pipe sections of the convolutions 13 interengage, so that the number of fins per unit length of pipe section 13 can be larger than if the fins of superimposed and subjacent pipe sections were to similarly interengage. The fins 14—which are here substantially circular—of the upper convolutions—meaning those directly below the underside of the bed 1—are flattened at 14a so that the bed 1 is supported on and carried by these fins. Advantageously, such flattened facets 14a are located at the level of the intersection of interengaging ones of the fins.

In the embodiment of FIG. 6 the fins 15 and 14 of laterally and subjacent convolutions 13 will be seen to so interengage that all convolutions may be arranged with identical spacing from one another. Naturally, the fins need not be of circular or generally circular outline; they could also, for instance, have a quadratic outline and be oriented transversely to the respective convolution or else longitudinally thereof.

FIGS. 7 and 7a show a convolution 17 which is provided with longitudinally extending fins 18. However, here the fins 18 are provided only at the straight-line portions of the respective convolution, not on the curved portions thereof, as FIG. 7 clearly shows.

The diagrammatic illustration of FIG. 8 shows the sequence in which the fins 14 and 15 of laterally adjacent and subjacent convolutions interengage. An upper layer of convolutions 13 is shown in full lines with its fins 14; a subjacent layer with its fins 15 in broken lines. For better understanding the left-hand portion of FIG. 8 only the upper layer with the fins 14, while the right-hand portion shows only the lower layer with the fins 15. Intermediate the left-hand and right-hand portions there is then shown the interengagement of the ribs 14 and 15 as it exists throughout the interior of the housing of the gas-cooler C in the requisite embodiment.

Figure 9:
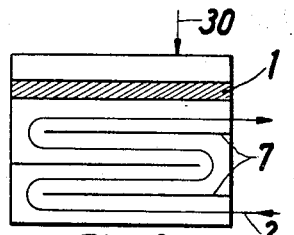
FIG. 9 is a schematic side-elevational view of still a further embodiment of the invention.
Figure 10:
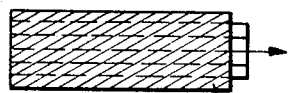
FIG. 10 is a top plan view of FIG. 9.

In the embodiment of FIGS. 9 and 10 there is shown an arrangement where the catalyzer bed 1 has an outline which extends over the entire upper cross-sectional area of gas-cooler housing, the gas-cooler in toto being identified again with reference designation C. The arrow 30 indicates that the air-methanol mixture is supplied in the same manner as in the FIGS. 1–4 embodiments.

Figure 11:
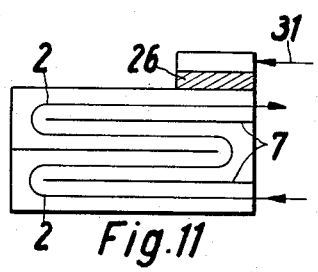
FIG. 11 is a view similar to FIG. 9 but showing an additional embodiment of the invention.
Figure 12:
FIG. 12 is a top-plan view of FIG. 11.

In FIGS. 11 and 12 the catalyzer bed 26 is arranged in the region where the tube or tubes constituting the convolutions 2 leave the gas-cooler C. In this embodiment the walls 7 are again provided as before. The bed 26 does not extend over the entire length of the gas-cooler housing (from left to right in FIGS. 11 and 12), meaning that in this direction it is not coextensive with the housing, a fact which is clearly shown in these figures. The outline of the bed 26 may be quadratic, or otherwise configurated.

Figure 13:
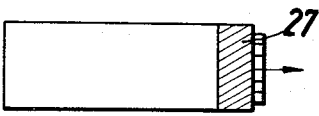
FIG. 13 is a top-plan view of yet an additional embodiment.

In FIG. 13 the arrangement is similar to FIGS. 11 and 12, except that the outline of the catalyzer bed 27 is different. Specifically, in FIG. 13 the outline of the bed 27 is such that the latter is wider than it is long (again seen in direction from left to right in the figure).

Figure 14:
FIG. 14 is a view similar to FIG. 13 but of still a further embodiment.

FIG. 14 differs from FIGS. 11 and 13 in that the catalyzer bed 28 is longer than it is wide.

Figure 15:
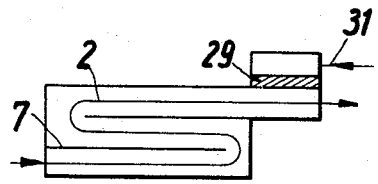
FIG. 15 is a view similar to FIG. 9, showing a final exemplary embodiment of the invention.

FIG. 15, finally, shows an embodiment wherein the catalyzer bed 29 is located outside the cross-sectional area of the actual housing of the gas cooler. As shown, the housing is provided in this embodiment with a lateral over-hang in which or on which the bed 29 is accommodated.

The supply of the air-methanol mixture may also take place from the narrow side of the gas cooler housing as suggested by the arrow 31, insofar as the embodiments of FIGS. 11, 13, 14 and 15 are concerned. FIG. 15 also shows that the inlet and outlet of the tube or tubes from which the respective convolutions are formed, can be located at different—e.g. opposite—sides, rather than both at one and the same side, especially when the interior of the gas cooler housing is subdivided into an uneven number of internal compartments.

The walls 7 may alternately terminate short of opposite end walls of the gas cooler housing. In this case the gas is forced to traverse a serpentine path towards the outlet O, meaning that as it enters each successive compartment C', C" or C'" it is forced to reverse its direction of travel.

By having the bed supported directly on the fins of the convolutions as in the embodiment of FIG. 5, the distance between the underside of the bed at which the gas escapes and the upper cooling coil convolution, can be kept at an absolute minimum with the attendant advantages in terms of rapid cooling and substantially complete suppression of undesired secondary reactions. If the fins are of quadratic outline the need for separately forming the flat facets 14a is avoided, and this also makes possible an arrangement of the convolutions especially close together, resulting in a construction which affords high gas speed with concomitant good heat exchange.

By having the fins extend longitudinally of the convolutions, and preferably only on the straight portions thereof, the manufacture of the coil is considerably simplified without having to accept any material reduction in the efficiency of cooling which can be obtained.

The arrangement of the finned convolutions with reference to one another is also an aspect which is of importance in the context and for the purposes of the invention. Optimum values can be determined for the heat-exchange surface area of the fins and for respective spacing, depending upon the flow speed of the cooling medium, the temperature difference between the cooling medium and the gas, the thermal conductivity of the fins and of convolutions, and the thermal conductivity at the juncture between fins and convolutions.

These values are preferably so selected that in an arrangement in which only the ribs of laterally adjacent convolutions interengage, the gas flow speed around the convolutions is sufficiently rapid to assure the desired good heat exchange. In such an arrangement the number of fins per unit length of the convolutions can be greater than if the fins of both the laterally adjacent as well as of the subjacent convolutions were to interengage. On the other hand, the latter type of arrangement makes it possible to have a greater number of convolutions per unit of cross-sectional area and thus enables the use of lower cooling medium flow speeds; this, in turn, permits the use of tubes of smaller cross-section or else results in lower pressure losses.

With the arrangement according to the present invention the cooling medium can be forcibly circulated, in the manner already indicated. A substantial advantage of this is the fact that flow retardation in the cooling medium—caused, for example, by the development of steam pockets in the convolutions—is avoided thereby. Also, forced circulation improves heat exchange with the gas over what is possible by mere natural circulation.

Thus it will be seen that in accordance with the present invention relatively high flow speeds for the gas as well as for the cooling medium can be obtained under advantageous circumstances. All of this results in excellent heat exchange conditions which makes it possible to maintain the heat exchange surface areas involved much smaller than in equal capacity cooling devices of the known cylindrical type.

What is claimed as new, and desired to be protected by Letters Patent, is set forth in the appended claims following hereafter.

1. A single-stage catalytic conversion arrangement for catalytic conversion of methanol and an oxygen-containing gas into formaldehyde, comprising a bed of catalyzer having a first side and an opposite second side; feeding means for feeding a mixture of fluids reactive with said catalyzer into said bed at said first side, with resultant derivation at said second side of a stream of enriched gas which requires cooling; and cooling means including at least one cooling coil adjacent said second side of said bed for receiving and cooling said stream of gas, said cooling means comprising at least one cooling compartment having two spaced side walls, and deflecting means extending transverse to the flow of gas emanating from said opposite second side of said catalyzer from one of said side walls towards but short of the other of said side walls for deflecting and guiding said stream of gas through said cooling compartment and for effecting successive reversal of the flow direction of said stream of gas during passage thereof through said compartment.

2. An arrangement as defined in claim 1, said cooling means comprising cooling coil means having a plurality of elongated sections which are located in said compartments, and circulating means for circulating a cooling fluid through said cooling coil means in substantially countercurrent flow to the flow of the stream of gas.

3. An arrangement as defined in claim 1, wherein said cooling compartment is of rectangular outline.

4. An arrangement as defined in claim 1, wherein said cooling coil comprises a plurality of convolutions, and circulating means for circulating a cooling fluid through said convolutions.

5. An arrangement as defined in claim 4, said deflecting means comprising a plurality of partition walls each having at least one aperture therein.

6. An arrangement as defined in claim 4, further comprising a housing beneath said second side of said bed and accommodating said at least one cooling coil.

7. An arrangement as defined in claim 6, said housing having an upper inlet side, and said coil having an inlet and an outlet with the latter being arranged in the region of said upper inlet side; and wherein said bed and said outlet are located exteriorly of said upper inlet side.

8. An arrangement as defined in claim 6, wherein said upper inlet side has predetermined length and width dimensions; and wherein said bed is at least substantially coextensive with at least one of said dimensions.

9. A single-stage catalytic conversion arrangement for catalytic conversion of methanol and an oxygen-containing gas into formaldehyde, comprising a bed of catalyzer having an upper side and a lower side; feeding means for feeding a mixture of fluids reactive with said catalyzer into said bed at said upper side, with resultant derivation at said lower side of a stream of enriched gas which requires cooling; and cooling means adjacent to and beneath said lower side of said bed for receiving and cooling said stream of gas, said cooling means comprising cooling conduit means extending along said second side proximal to but out of engagement therewith, and a plurality of cooling fins projecting transversely from said cooling conduit means for increasing the heat-exchange surface area thereof, at least some of said cooling fins engaging said second side from beneath said bed for supporting the latter on and immediately proximal to said cooling conduit means.

10. An arrangement as defined in claim 9, at least some of said cooling fins having upwardly directed flat facets in supporting engagement with said lower side of said bed.

11. An arrangement as defined in claim 9, wherein said cooling conduit means comprises a plurality of convolutions located on superimposed levels; and wherein said cooling fins on each convolution mesh with the cooling fins on the respectively superimposed and subjacent convolutions.

12. An arrangement as defined in claim 9, wherein said cooling conduit means comprises a plurality of adjacent convolutions; and wherein said cooling fins on the respectively adjacent convolutions intermesh with one another.

13. An arrangement as defined in claim 9, wherein said cooling conduit means comprises at least one cooling conduit of at least substantially quadratic cross-section.

References Cited

UNITED STATES PATENTS

| | | | |
|---|---|---|---|
| 1,270,989 | 7/1918 | Taliani | 23—288 K |
| 1,782,824 | 11/1930 | Hechenbleikner | 23—288 K |
| 1,959,151 | 5/1934 | Beekley | 23—288 K X |
| 2,299,197 | 10/1942 | West | 23—288 K |
| 2,504,402 | 4/1950 | Field | 260—603 HF |
| 2,585,441 | 2/1952 | Cornell et al. | 23—288 K |
| 2,585,462 | 2/1952 | Hirsch | 23—288 K |
| 3,106,581 | 10/1963 | Neely | 260—603 HF |
| 3,395,982 | 8/1968 | Didycz | 23—288 R X |

BARRY S. RICHMAN, Primary Examiner

U.S. Cl. X.R.

23—288 R; 260—603 HF